(12) United States Patent
Hatori et al.

(10) Patent No.: US 8,768,588 B2
(45) Date of Patent: Jul. 1, 2014

(54) TRANSMISSION AND METHOD OF SHIFT CONTROL FOR TRANSMISSION

(75) Inventors: Hiroki Hatori, Nishio (JP); Hiroshi Toyoda, Nishio (JP); Takeshige Miyazaki, Nishio (JP); Yoshiki Ito, Nishio (JP); Kiyoshi Nagami, Anjo (JP); Atsushi Takeuchi, Anjo (JP)

(73) Assignees: Aisin AI Co., Ltd., Aichi-ken (JP); Aisin AW Co., Ltd., Aichi-ken (JP)

( * ) Notice: Subject to any disclaimer, the term of this patent is extended or adjusted under 35 U.S.C. 154(b) by 790 days.

(21) Appl. No.: 12/729,860

(22) Filed: Mar. 23, 2010

(65) Prior Publication Data

US 2010/0250078 A1  Sep. 30, 2010

(30) Foreign Application Priority Data

Mar. 24, 2009 (JP) ................. 2009-071979

(51) Int. Cl.
G06F 7/00 (2006.01)

(52) U.S. Cl.
USPC ........... 701/66; 74/325; 74/330; 74/331; 74/335; 74/340; 477/5; 477/115; 477/180

(58) Field of Classification Search
USPC ........ 74/325, 330, 331, 335, 340; 477/5, 115, 477/180
See application file for complete search history.

(56) References Cited

U.S. PATENT DOCUMENTS

| 8,256,312 | B2 * | 9/2012 | Hatori et al. | 74/330 |
| 2002/0189383 | A1 * | 12/2002 | Schamscha | 74/340 |
| 2005/0101432 | A1 * | 5/2005 | Pels et al. | 477/5 |
| 2005/0229732 | A1 * | 10/2005 | Hara | 74/325 |
| 2005/0282683 | A1 * | 12/2005 | Tanba et al. | 477/180 |
| 2005/0284242 | A1 * | 12/2005 | Ogami et al. | 74/325 |
| 2007/0142171 | A1 * | 6/2007 | Jiang | 477/115 |
| 2007/0199393 | A1 * | 8/2007 | Hattori | 74/331 |
| 2009/0145253 | A1 * | 6/2009 | Katakura et al. | 74/335 |

FOREIGN PATENT DOCUMENTS

| JP | 10-318361 | 12/1998 |
| JP | 2007-078087 | 3/2007 |
| JP | 2007-292250 | 11/2007 |
| JP | 2010-078123 | 4/2010 |

OTHER PUBLICATIONS

Notification of reasons for Refusal issued by the Japan Patent Office on Dec. 20, 2012.

* cited by examiner

Primary Examiner — James Trammell
Assistant Examiner — Sanjeev Malhotra
(74) Attorney, Agent, or Firm — IP & T Group LLP

(57) ABSTRACT

A transmission includes a controller being provided with a change-speed stage anticipator. The controller adopts a time, which one of the transmission's gear-mechanism selectors requires in shifting a current change-speed stage to another change-speed stage, as a pre-shift time for selecting the latter change-speed stage. The change-speed stage anticipator operates the one of the gear-mechanism selectors while adopting a temporary change-speed stage as a subsequent change-speed stage when the temporary change-speed stage, which is estimated from a state of vehicle after the pre-shift time, the state of vehicle being relevant to each element of an anticipated change-speed stage group that is made up of one or more of the change-speed stages that can be selected by the one of the gear-mechanism selectors being set on one of the transmission's input shafts that is disconnected from a power source, coincides with an anticipated change-speed stage that corresponds to the pre-shift time.

16 Claims, 11 Drawing Sheets

TRANSMISSION AND METHOD OF SHIFT CONTROL FOR TRANSMISSION

INCORPORATION BY REFERENCE

The present invention is based on Japanese Patent Application No. 2009-71,979, filed on Mar. 24, 2009, the entire contents of which are incorporated herein by reference.

BACKGROUND OF THE INVENTION

1. Field of the Invention

The present invention relates to a transmission, and a method of shift control for transmission. In particular, it relates to a dual-clutch transmission comprising two clutches, and a method of shift control for such dual-clutch transmission.

2. Description of the Related Art

One of transmissions for automobile is a dual-clutch transmission that comprises two clutches, namely, which uses a so-called dual-clutch mechanism, (hereinafter abbreviated to as "DCT"). Upon switching change-speed stages, the DCT is characterized in that it can carry out shifting operations quickly without cutting off or interrupting torque transmissions.

As disclosed in United State Patent Application Publication No. 2007/0142171 A1, for instance, a DCT is controlled for changing speeds so that it can change speeds quickly in accordance with change-speed requests. That is, when a vehicle is traveling with a change-speed stage, which is set on an input shaft that corresponds to one of the clutches being connected, the DCT preliminarily selects (or pre-shifts to) another change-speed stage, which is set on another input shaft that corresponds to the other one of the clutches being disconnected. The DCT usually determines a change-speed stage, to which it is going to pre-shift, using a current vehicular condition, such as a vehicle speed and an accelerator opening magnitude, while consulting a map for pre-shifting.

However, in the technique of the related art that determines a target change-speed stage using a map for pre-shifting, a change-speed stage, which is prepared by means of pre-shifting, might differ greatly from a target change-speed stage, to which a change-speed request is issued, when the vehicle's state has changed considerably between the following instances, namely, an instance after determining a change-speed stage to be pre-shifted to, and another instance after the pre-shifting is completed and when an actual change-speed request arises. If such is the case, the conventional DCT cannot pre-shift to an appropriate change-speed stage, and eventually has to redo pre-shifting once again. As a result, it might not become possible to make best use of the DCT's advantage, enabling a driver to carry out change-speed operations quickly.

For example, when a driver decelerates or accelerates a vehicle abruptly, a change-speed stage for pre-shift that the conventional DCT has determined based on a vehicular condition before the abrupt deceleration or acceleration might not be an appropriate one because of a remarkable change in the vehicular condition. In such an instance, the conventional DCT retries to pre-shift to another reasonable change-speed stage on the issuance of a change-speed request, and then switches from one of the clutches to the other. Accordingly, the driver might feel slowness or retard to suffer from feelings of annoyance or unpleasantness. Alternatively, it is possible to think of subjecting the conventional DOT, which is kept being pre-shifted to other than the reasonable change-speed stage, to a change-speed control as it is. However, the conventional DCT whose change-speed stage has not been shifted to the reasonable change-speed stage might give the driver feelings of annoyance or unpleasantness.

SUMMARY OF THE INVENTION

The present invention has been developed in view of the aforementioned problematic issues. It is therefore an object of the present invention to provide a transmission and a method of shift control for transmission, transmission and method which can reduce annoyance or unpleasantness that a driver might feel by making it possible to complete pre-shifting to adequate change-speed stages upon change-speed requests.

For example, a transmission according to the present invention can achieve the aforementioned object, and comprises:

a first clutch being capable of switching between a connection state being connected to a power source and a disconnection state being disconnected from the power source;

a second clutch being capable of switching between a connection state being connected to the power source and a disconnection state being disconnected from the power source;

a first input shaft being detachably connected to the power source by the first clutch;

a second input shaft being detachably connected to the power source by the second clutch;

an output shaft;

a first change-speed mechanism being disposed between the first input shaft and the output shaft, and comprising a first gear mechanism for making a combination of a plurality of change-speed stages and a first gear-mechanism selector for selecting one of the change-speed stages;

a second change-speed mechanism being disposed between the second input shaft and the output shaft, and comprising a second gear mechanism for making a combination of a plurality of change-speed stages and a second gear-mechanism selector for selecting one of the change-speed stages;

a controller for controlling the first clutch, the second clutch, the first gear-mechanism selector, and the second gear-mechanism selector;

the controller adopting a time, which one of the first and second gear-mechanism selectors requires in shifting a current change-speed stage to other change-speed stages, as a pre-shift time for selecting the latter change-speed stage; and the controller comprising a change-speed stage anticipator for operating the one of the first and second gear-mechanism selectors while adopting a temporary change-speed stage as a subsequent change-speed stage when the temporary change-speed stages that is estimated from a state of vehicle after the pre-shift time, the state of vehicle being relevant to each element of an anticipated change-speed stage group that is made up of one or more of the change-speed stages that can be selected by the one of the first and second gear-mechanism selectors being set on one of the first and second input shafts that is disconnected from the power source, coincides with an anticipated change-speed stage that corresponds to the pre-shift time.

In a first optional setting of the present transmission, the anticipated change-speed stage group can preferably be made up of a previous change-speed stage and/or a subsequent change-speed stage with respect to a current change-speed stage that the other one of the first and second gear-mechanism selectors selects at present.

In a second optional setting of the present transmission, the anticipated change-speed stage group can preferably be made up of all of the change-speed stages that the one of the first and second gear-mechanism selectors can select.

In a third optional setting of the present transmission, the change-speed stage anticipator can preferably estimate the temporary change-speed stage by means of shift mapping using a vehicle speed after the pre-shift time and a current accelerator opening magnitude.

In a fourth optional setting of the present transmission, the change-speed stage anticipator can preferably estimate the temporary change-speed stage by means of shift mapping using a vehicle speed after the pre-shift time and an accelerator opening magnitude after the pre-shift time.

In a fifth optional setting of the present transmission, the change-speed stage anticipator can preferably adopt a change-speed stage, which complies with a torque for every change-speed stage that is estimated from a vehicle speed after the pre-shift time and an accelerator opening magnitude after the pre-shift time, as the temporary change-speed stage.

In a sixth optional setting of the present transmission, the controller can preferably further comprise a pre-shift time anticipator for estimating the pre-shift time based on a state of vehicle. Note herein that it is possible to give the following to employ as the "state of vehicle": a vehicle speed, an accelerator opening magnitude, an input revolution, a temperature (e.g., an oil temperature, an engine-coolant temperature, and an ambient temperature), a vehicle acceleration, and an input/output relative revolution.

In a seventh optional setting of the present transmission, the controller can preferably further comprise a corrector for correcting the pre-shift time based on an actual pre-shift time that the one of the first and second gear-mechanism selectors requires for the shifting actually.

Moreover, a method of shift control for transmission according to the present invention can achieve the aforementioned object as well. The present shift-control method is adapted, for instance, for transmission comprising:

a first clutch being capable of switching between a connection state being connected to a power source and a disconnection state being disconnected from the power source;

a second clutch being capable of switching between a connection state being connected to the power source and a disconnection state being disconnected from the power source;

a first input shaft being detachably connected to the power source by the first clutch;

a second input shaft being detachably connected to the power source by the second clutch;

an output shaft;

a first change-speed mechanism being disposed between the first input shaft and the output shaft, and comprising a first gear mechanism for making a combination of a plurality of change-speed stages and a first gear-mechanism selector for selecting one of the change-speed stages;

a second change-speed mechanism being disposed between the second input shaft and the output shaft, and comprising a second gear mechanism for making a combination of a plurality of change-speed stages and a second gear-mechanism selector for selecting one of the change-speed stages;

a controller for controlling the first clutch, the second clutch, the first gear-mechanism selector, and the second gear-mechanism selector;

and the present shift-control method comprises the steps of:

having the controller adopt a time, which one of the first and second gear-mechanism selectors requires in shifting a current change-speed stage to other change-speed stages, as a pre-shift time for selecting the latter change-speed stage;

having the controller estimate a temporary change-speed stage from a state of vehicle after the pre-shift time, the state of vehicle being relevant to each element of an anticipated change-speed stage group that is made up of one or more of the change-speed stages that can be selected by the one of the first and second gear-mechanism selectors being set on one of the first and second input shafts that is disconnected from the power source; and having the controller operate the one of the first and second gear-mechanism selectors while adopting the temporary change-speed stage as a subsequent change-speed stage when the temporary change-speed stage coincides with an anticipated change-speed stage that corresponds to the pre-shift time.

In a first optional setting of the present shift-control method, the anticipated change-speed stage group can preferably be made up of a previous change-speed stage and/or a subsequent change-speed stage with respect to a current change-speed stage that the other one of the first and second gear-mechanism selectors selects at present.

In a second optional setting of the present shift-control method, the anticipated change-speed stage group can preferably be made up of all of the change-speed stages that the one of the first and second gear-mechanism selectors can select.

In a third optional setting of the present shift-control method, it is preferable that the temporary change-speed stage can be estimated by means of shift mapping using a vehicle speed after the pre-shift time and a current accelerator opening magnitude in the step of having the controller estimate a temporary change-speed stage.

In a fourth optional setting of the present shift-control method, it is preferable that a change-speed stage, which complies with a torque for every change-speed stage that is estimated from a vehicle speed after the pre-shift time and an accelerator opening magnitude after the pre-shift time, can be adopted as the temporary change-speed stage in the step of having the controller estimate a temporary change-speed stage.

In a fifth optional setting of the present shift-control method, it is preferable that a change-speed stage, which complies with a torque for every change-speed stage that is estimated from a vehicle speed after the pre-shift time and an accelerator opening magnitude after the pre-shift time, can be adopted as the temporary change-speed stage in the step of having the controller estimate a temporary change-speed stage.

In a sixth optional setting of the present shift-control method, the present shift control method can preferably further comprise a step of having the controller estimate the pre-shift time based on a state of vehicle.

In a seventh optional setting of the present shift-control method, the present shift control method can preferably further comprise a step of having the controller correct the pre-shift time based on an actual pre-shift time that the one of the first and second gear-mechanism selectors requires for the shifting actually.

The transmission according to the present invention makes a dual-clutch transmission. The present transmission comprises a controller that is provided with a change-speed stage anticipator. The controller computes a pre-shift time for each of the elements (i.e., anticipated change-speed stages) of an anticipated change-speed stage group. The change-speed stage anticipator estimates a temporary change-speed stage after each of the pre-shift times. Moreover, the change-speed stage anticipator selects one or more of the anticipated change-speed stages from the anticipated change-speed stage group, namely, from a combination of the anticipated change-speed stages that the controller used to compute the pre-shift times. In addition, the change-speed stage anticipator compares the estimated temporary change-speed stage with another temporary change-speed stage that is derived from the selected anticipated change-speed stages. Then, the change-speed stage anticipator adopts the derived temporary change-speed stage as a subsequent change-speed stage when the estimated temporary change-speed stage coincides with the derived temporary change-speed stage. In other words, the present transmission does not make any pre-shift operation to the derived temporary change-speed stage, which is derived from one of the anticipated change-speed stages being selected, when the estimated temporary change-speed stage does not coincide with the derived temporary change-speed stage.

Thus, the change-speed stage anticipator that operates as described above enables the controller to anticipate in advance that a pre-shifted change-speed stage is not appropriate depending on a vehicular condition after the pre-shifting has been completed actually. To put it differently, the change-speed stage anticipator makes it possible for the controller to anticipate prior to the pre-shifting that the derived temporary change-speed stage does not coincide with the estimated temporary change-speed stage. As a result, the present transmission can be pre-shifted to a change-speed stage that is suitable for a situation upon the issuance of a change-speed request that would arise after a certain pre-shift time has passed. The present transmission that carries out the change-speed operation smoothly does not give drivers any feelings of annoyance or unpleasantness at all. Note that, as for the claimed "current change-speed stage," it is possible to give the following instances: the claimed "first or second gear-mechanism selector" selects one of the change-speed stages; and the "first or second gear-mechanism selector" does not select any one of the change-speed stages. Moreover, the "pre-shift time" is a time that is required for shifting a certain current change-speed to one of the other change-speed stages. In addition, the claimed "pre-shift time" does not involve a time that is required for issuing a change-speed request. That is, the "pre-shift time" is a time that is required for a driver to establish the other change-speed stage by moving a shift lever actually. Moreover, although factors that change the "pre-shift time" cannot be specified herein especially, it is possible to think of various factors, such as limits in speeds in change-speed operations and limiting the speeds for the sake of making transmission quiet.

The first optional setting that is directed to the present transmission can reduce the processing load to the controller for anticipating a subsequent change-speed stage, because it limits probable change-speed stages, which are to be examined whether they can make a subsequent change-speed stage, to change-speed stages that are close to a currently running change-speed stage.

The second optional setting that is directed to the present transmission can make it possible to select various change-speed stages that can cope with a variety of vehicular conditions, because the anticipated change-speed stage group employs change-speed stages, which are to be examined whether they can make a subsequent change-speed stage, as many as possible to make a complete set of the change-speed stage group.

The third optional setting that is directed to the present transmission enables the controller to anticipate a more appropriate subsequent change-speed stage, because the change-speed stage anticipator applies a vehicle speed after the pre-shift time and a current accelerator opening magnitude to a shift map, which illustrates relationships between vehicle speeds and accelerator opening magnitudes, and then estimates a temporary change-speed stage.

The fourth optional setting that is directed to the present transmission enables the controller to anticipate a more appropriate subsequent change-speed stage, because the change-speed stage anticipator applies a vehicle speed after the pre-shift time and an accelerator opening magnitude after the pre-shift time to a shift map, which illustrates relationships between vehicle speeds and accelerator opening magnitudes, and then estimates a temporary change-speed stage.

The fifth optional setting that is directed to the present transmission enables the controller to anticipate a more appropriate subsequent change-speed stage, because the change-speed stage anticipator applies a vehicle speed after the pre-shift time and an accelerator opening magnitude after the pre-shift time to a shift map, which illustrates relationships between vehicle speeds, accelerator opening magnitudes and torques for the change-speed stages, and estimates a change-speed stage, which conforms to one of the torques, and then determines the estimated change-speed stage as a temporary change-speed stage.

The sixth optional setting that is directed to the present transmission enables the controller to estimate a temporary change-speed stage after the pre-shift time that conforms to a vehicular condition, because the pre-shift time anticipator estimates the pre-shift time based on the specific vehicular condition.

The seventh optional setting that is directed to the present transmission enables the controller to estimate a temporary change-speed stage after the pre-shift time that is more appropriate, because the corrector corrects the pre-shift time to make it more precise. Note that it is believed that the claimed "pre-shift time" might depend on vehicles because of fluctuations during the manufacture. Accordingly, correcting the "pre-shift time" for respective vehicles, including correcting it taking drivers' driving manners into consideration, leads to computing more accurate pre-shift times and eventually results in enabling the controller to estimate a more appropriate temporary change-speed stage.

In the shift-control method for transmission according to the present invention, a controller for dual-clutch transmission is operated in the following manner. The controller is operated to compute a pre-shift time for each of the elements (i.e., anticipated change-speed stages) of an anticipated change-speed stage group. Then, in the step of having the controller estimate a temporary change-speed state that is relevant to the present shift-control method, the controller is operated to estimate a temporary change-speed stage after each of the pre-shift times. Moreover, the controller is operated to select one or more of the anticipated change-speed stages from the anticipated change-speed stage group, namely, from a combination of the anticipated change-speed stages that the controller used to compute the pre-shift times. In addition, the controller is operated to compare the estimated temporary change-speed stage with another temporary change-speed stage that is derived from the selected anticipated change-speed stages. Then, the controller is operated to adopt the derived temporary change-speed stage as a subsequent change-speed stage, which is derived from one of the anticipated change-speed stages being selected, when the estimated temporary change-speed stage coincides with the derived temporary change-speed stage. In other words, the controller is operated to inhibit the dual-clutch transmission from making any pre-shift operation to the derived temporary change-speed stage when the derived temporary change-speed stage does not coincide with the estimated temporary change-speed stage.

By means of thus controlling the dual-clutch transmission, it is possible to anticipate in advance that a pre-shifted change-speed stage is not appropriate depending on a vehicular condition after the pre-shifting has been completed actually. To put it differently, it is possible to anticipate prior to the pre-shifting that the derived temporary change-speed stage does not coincide with the estimated temporary change-speed stage. As a result, it is possible to pre-shift the dual-clutch transmission to a change-speed stage that is suitable for a situation upon the issuance of a change-speed request that would arise after a certain pre-shift time has passed. Therefore, the present shift-control method does not give drivers any feelings of annoyance or unpleasantness at all, because it controls the dual-clutch transmission so that it can carry out the change-speed operation smoothly.

In the first optional setting that is relevant to the present shift-control method for transmission, the step of having the controller estimate a temporary change-speed stage is adapted to limiting probable change-speed stages, which are to be looked for as a probable candidate for making a subsequent change-speed stage, to change-speed stages that are close to a currently running change-speed stage. Hence, it is possible to reduce the processing load to the controller for anticipating a subsequent change-speed stage.

In the second optional setting that is relevant to the present shift-control method for transmission, the step of having the controller estimate a temporary change-speed stage is adapted to employing change-speed stages, which are to be looked for as a probable candidate for making a subsequent change-speed stage, as many as possible to make a complete set of the anticipated change-speed stage group. Hence, it is possible to select various change-speed stages that can cope with a variety of vehicular conditions.

In the third optional setting that is relevant to the present shift-control method for transmission, the step of having the controller estimate a temporary change-speed stage is adapted to applying a vehicle speed after the pre-shift time and a current accelerator opening magnitude to a shift map, which illustrates relationships between vehicle speeds and accelerator opening magnitudes, and then estimating a temporary change-speed stage. Hence, it is possible to anticipate a subsequent change-speed stage more appropriately.

In the fourth optional setting that is relevant to the present shift-control method for transmission, the step of having the controller estimate a temporary change-speed stage is adapted to applying a vehicle speed after the pre-shift time and an accelerator opening magnitude after the pre-shift time to a shift map, which illustrates relationships between vehicle speeds and accelerator opening magnitudes, and then estimating a temporary change-speed stage. Hence, it is possible to anticipate a subsequent change-speed stage more appropriately.

In the fifth optional setting that is relevant to the present shift-control method for transmission, the step of having the controller estimate a temporary change-speed stage is adapted to applying a vehicle speed after the pre-shift time and an accelerator opening magnitude after the pre-shift time to a shift map, which illustrates relationships between vehicle speeds, accelerator opening magnitudes and torques for the change-speed stages, and estimating a change-speed stage, which conforms to one of the torques, and then determining the estimated change-speed stage as a temporary change-speed stage. Hence, it is possible to anticipate a subsequent change-speed stage more appropriately.

In the sixth optional setting that is relevant to the present shift-control method for transmission, the step of having the controller estimate a temporary change-speed stage is adapted to estimating the pre-shift time based on a vehicular condition. Hence, it is possible to estimate a temporary change-speed stage after the pre-shift time that conforms to the specific vehicular condition.

In the seventh optional setting that is relevant to the present shift-control method for transmission, the step of having the controller estimate a temporary change-speed stage is adapted to correcting the pre-shift time to make it more precise. Hence, it is possible to estimate a temporary change-speed stage after the pre-shift time more appropriately.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

Representative embodiments according to the present invention will be hereinafter described with reference to FIGS. 1 through 16. Transmissions that are directed to the present embodiments are mounted on a vehicle, respectively. Note that the drawings used for making descriptions are conceptual diagrams and accordingly might not necessarily illustrate the transmissions' specific parts exactly.

Figure 1:
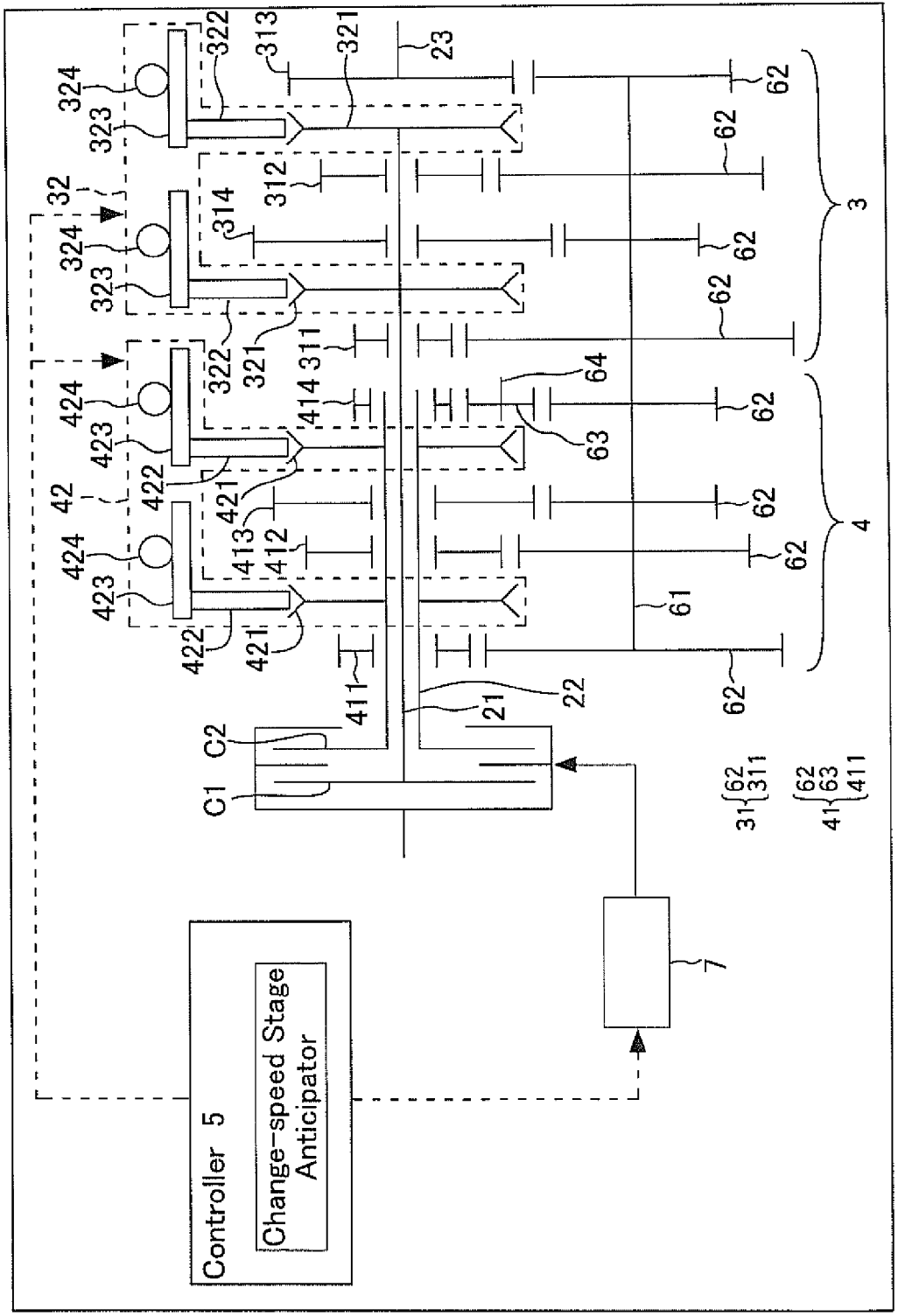
FIG. 1 illustrates an exemplary transmission.

As shown in FIG. 1, a transmission 1 according to the present invention comprises a first clutch "C1," a second clutch "C2," a first input shaft 21, a second input shaft 22, an output shaft 23, a first change-speed mechanism 3, a second change-speed mechanism 4, and a controller 5.

The first clutch "C1" is positioned between an internal combustion engine (or engine (not shown in the drawing)), which serves as a power source, and the first input shaft 21, which will be detailed later. The first clutch "C1" is a device for alternately transmitting and not transmitting an output torque from the internal combustion engine to the first input shaft 21. When the first clutch "C1" transmits an output torque from the internal combustion engine to the first input shaft 21, it is in the connected state. When the first clutch "C1" does not transmit any torque from the internal combustion engine to the first input shaft 21, it is in the disconnected state.

The second clutch "C2" is positioned between the internal combustion engine and the second input shaft 22 that will be detailed later. The second clutch "C2" is a device for alternately transmitting and not transmitting an output torque from the internal combustion engine to the second input shaft 22. When the second clutch "C2" transmits an output torque from the internal combustion engine to the second input shaft 22, it is in the connected state. When the second clutch "C2" does not transmit any torque from the internal combustion engine to the second input shaft 22, it is in the disconnected state.

The first clutch "C1" and second clutch "C2" are controlled by signals that the controller 5, which will be described later, produces. Note however that an electric actuator or a fluid-pressure hydraulic system serves as a power source for actuating the first clutch "C1" and second clutch "C2."

The first input shaft 21 is a rod-shaped member that couples with the first clutch "C1" to transmit a rotary torque. The second input shaft 22 is a cylinder-shaped member that couples with the second clutch "C2" to transmit a rotary torque. Note that the second input shaft 22 is disposed coaxially with the first input shaft 21 and is placed on an outer peripheral side to the first input shaft 21.

The output shaft 23 is a rod-shaped member that is disposed parallel to the first input shaft 21 and second input shaft 22. The output shaft 23 outputs an output torque, which is transmitted via the first change-speed mechanism 3 and second change-speed mechanism 4 that will be detailed later, to wheels (not shown).

The first change-speed mechanism 3 comprises a first gear mechanism 31, and a first gear-mechanism selector 32. The first gear mechanism 31 is a combination of a first-speed change-speed stage, a third-speed change-speed stage, a fifth-speed change-speed stage, and a seventh-speed change-speed stage that are disposed between the first input shaft 21 and the output shaft 23. Moreover, the first change-speed mechanism 3 further comprises a not-shown synchronizer that is disposed between each of the change-speed stages and later-described sleeves 321. The respective change-speed stages are made up of change-speed gears 311 through 314, a counter shaft 61, and counter gears 62 that correspond to the change-speed gears 311 through 314. The change-speed gears 311 through 319 are placed on an outer peripheral side to the first input shaft 21, and are retained rotatably and relatively to the first input shaft 21. The counter shaft 61 is disposed parallel to the first input shaft 21 and second input shaft 22. The counter gears 62 are fastened rotatably and integrally with the counter shaft 61. The change-speed gear 311 makes the first-speed change-speed stage. The change-speed gear 312 makes the third-speed change-speed stage. The change-speed gear 313 makes the fifth-speed change-speed stage. The change-speed gear 314 makes the seventh-speed change-speed stage.

The first gear-mechanism selector 32 comprises sleeves 321, forks 322, fork shafts 323, and actuators 324. The sleeves 321 are placed on an outer peripheral side to the first input shaft 21, and are retained rotatably and integrally with the first input shaft 21. Moreover, the sleeves 32 are made of a cylindrical member that is positioned between the two change-speed stages, respectively. To be concrete, the following embodiments according to the present invention comprise two sleeves 321 in total, one of which is disposed between the first-speed change-speed stage and the seventh-speed change-speed stage, and the other one of which is disposed between the third-speed change-speed stage and the fifth-speed change-speed stage. The sleeves 321 are provided with a neutral position at which they do not engage with either one of the change-speed stages, and an engagement position at which they engage with either one of the change-speed stages. Moreover, the sleeves 321 move between the neutral position and the engagement position in the axial direction. The forks 322 are placed on an outer peripheral side to the sleeves 321, respectively. Moreover, the forks 322 engage with the sleeves 321, respectively, so as to enable the sleeves 321 to move between the two change-speed stages (or between the neutral position and the engagement position) while rotating. The fork shafts 323 are made of a rod-shaped member that engages integrally with the forks 322, respectively. In addition, the actuators 324 actuate the fork shafts 323 so that the fork shafts 323 can move simultaneously with the actuation of the sleeves 321 by the forks 322.

The second change-speed mechanism 4 comprises a second gear mechanism 41, and a second gear-mechanism selector 42. The second gear mechanism 41 is a combination of a second-speed change-speed stage, a fourth-speed change-speed stage, a sixth-speed change-speed stage, and a reverse (or retreat) stage that are disposed between the second input shaft 22 and the output shaft 23. Moreover, the second change-speed mechanism 4 further comprises a not-shown synchronizer that is disposed between each of the change-speed stages and later-described sleeves 421. The respective change-speed stages are made up of change-speed gears 411 through 414, the counter shaft 61, and counter gears 62 that correspond to the change-speed gears 411 through 414. The change-speed gears 411 through 414 are placed on an outer peripheral side to the second input shaft 22, and are retained rotatably and relatively to the second input shaft 22. The counter gears 62 are fastened rotatably and integrally with the counter shaft 61. The change-speed gear 411 makes the second change-speed stage. The change-speed gear 412 makes the fourth-speed change-speed stage. The change-speed gear 413 makes the sixth-speed change-speed stage. The change-speed gear 414 makes the reverse stage.

Note that the reverse stage is further provided with an idler gear 63 that is disposed between the change-speed gear 414 and one of the counter gears 62. The idler gear 63 is retained rotatably to an idler-gear shaft 64. The idler-gear shaft 64 is disposed parallel to the first input shaft 21, second input shaft 22 and counter shaft 61, but is fixed unrotatably. When the controller 5, which will be described later, selects the reverse stage as a change-speed stage, a rotation of the second input shaft 22 is transmitted to the change-speed gear 414 of the reverse stage to rotate the idler gear 63. Then, the corresponding counter gear 62 rotates to rotate the counter shaft 61.

The second gear-mechanism selector 42 comprises sleeves 421, forks 422, fork shafts 923, and actuators 424. The sleeves 421 are placed on an outer peripheral side to the second input shaft 22, and are retained rotatably and integrally with the second input shaft 22. Moreover, the sleeves 421 are made of a cylindrical member that is positioned between the two change-speed stages, respectively. To be concrete, the following embodiments according to the present invention comprise two sleeves 921 in total, one of which is disposed between the second-speed change-speed stage and the fourth-speed change-speed stage, and the other one of which is disposed between the sixth-speed change-speed stage and the reverse stage. The sleeves 421 are provided with a neutral position at which they do not engage with either one of the change-speed stages, and an engagement position at which they engage with either one of the change-speed stages. Moreover, the sleeves 421 move between the neutral position and the engagement position in the axial direction. The forks 422 are placed on an outer peripheral side to the sleeves 421, respectively. Moreover, the forks 422 engage with the sleeves 421, respectively, so as to enable the sleeves 921 to move between the two change-speed stages (or between the neutral position and the engagement position) while rotating. The fork shafts 423 are made of a rod-shaped member that engages integrally with the forks 422, respectively. In addition, the actuators 424 actuate the fork shafts 423 so that the fork shafts 423 can move simultaneously with the actuation of the sleeves 421 by the forks 422.

The first gear-mechanism selector 32 and second gear-mechanism selector 42 are controlled by signals, which the controller 5 that will be detailed later produces. Moreover, the actuators 324 and 424 are driven by an electric cylinder, a fluid-pressure hydraulic cylinder or a pneumatic cylinder, respectively, which commonly serves as a power source.

The controller 5 controls the first clutch "C1," the second clutch "C2," the first gear-mechanism selector 32, and the second gear-mechanism selector 42. Moreover, the controller 5 comprises a change-speed stage anticipator for estimating a subsequent change-speed stage. The change-speed stage anticipator estimates subsequent change-speed stages that one of the first gear-mechanism selector 32 or second gear-mechanism selector 42 may select after a pre-shift time.

The transmission 1 according to the present invention will be hereinafter described in detail while specifying various embodiments on the controller 5, because the present transmission 1 is characterized in the controller 5.

Embodiment No. 1

Figure 2:
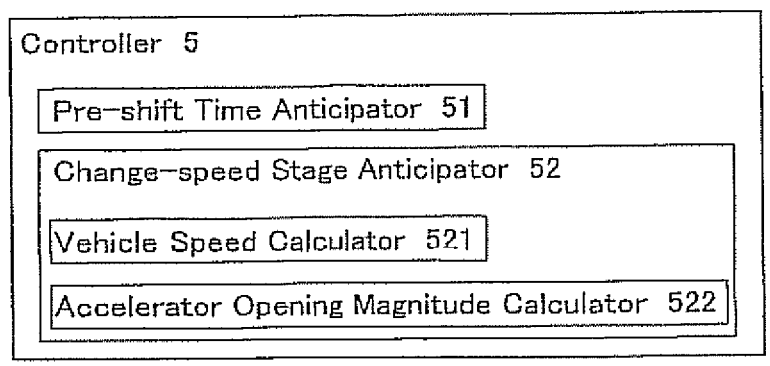
FIG. 2 illustrates an exemplary controller 5 for a transmission.
Figure 3:
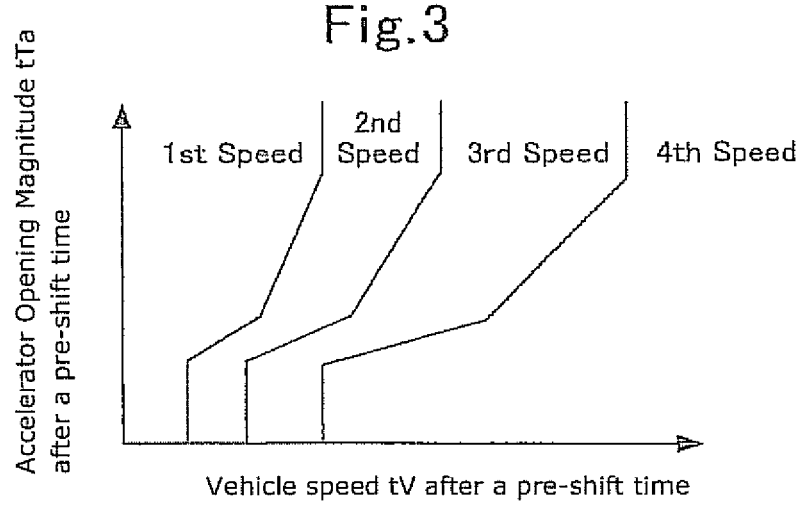
FIG. 3 illustrates an exemplary shift map for a controller for a transmission.

As illustrated in FIG. 2, the present transmission 1 according to Embodiment No. 1 uses the controller 5 that comprises a pre-shift time anticipator 51, a change-speed stage anticipator 52, and a not-shown change-speed controller. FIG. 2 is an explanatory diagram which depicts the controller 5 alone that is taken out of the present transmission 1. Moreover, the change-speed controller carries out change-speed control operations by means of a shift map that is shown in FIG. 3, for instance.

Figure 4:
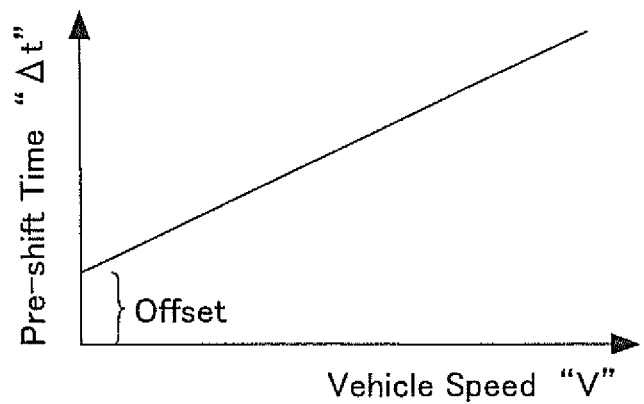
FIG. 4 illustrates an exemplary shift map for a controller for a transmission.

The pre-shift time anticipator 51 finds a pre-shift time "Δt" that is required when one of the first gear-mechanism selector 32 or second gear-mechanism selector 42 shifts from the current change-speed stage to a certain subsequent change-speed stage based on a state of vehicle. The term, "current change-speed stage," refers to the following cases: one of the first gear-mechanism selector 32 or second gear-mechanism selector 42 selects one of the change-speed stages; or one of the first gear-mechanism selector 32 or second gear-mechanism selector 42 does not select any one of the change-speed stages. That is, one of the sleeves 321 or the sleeves 421 is located at the neutral position. Moreover, the controller 5 records, in advance, a pre-shift time map having a correlative relationship between a state of the vehicle and pre-shift time "Δt." For example, the pre-shift time map can be one as illustrated in FIG. 4. The pre-shift time map shown in FIG. 4 is composed of a horizontal axis that designates vehicle speeds "V," and a vertical axis that designates pre-shift times "Δt." As for the "state of vehicle," it is possible to think of accelerator opening magnitudes "Ta" and input revolutions in addition to the vehicle speeds "V." If such is the case, the controller 5 records a relationship between one of these alternatives and the pre-shift time "Δt" as a pre-shift time map, or such a pre-shift time map can be recorded in another memory that is accessible for the controller 5.

Figure 5:
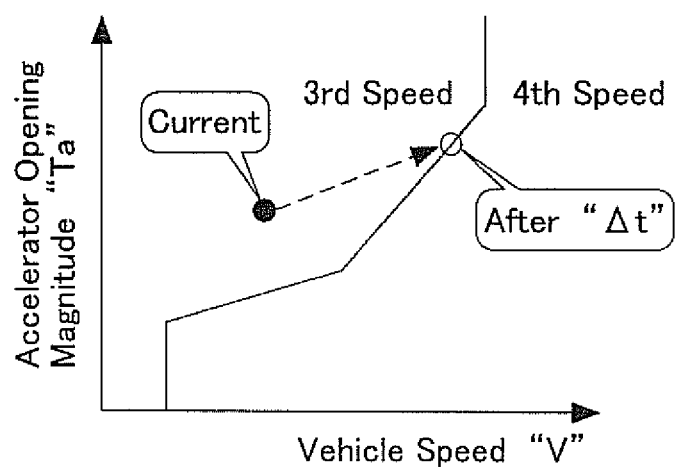
FIG. 5 is a graphical explanatory diagram illustrating how an exemplary controller for a transmission estimates an optimum change-speed stage.

The change-speed stage anticipator 52 anticipates a subsequent change-speed stage from the change-speed stage of one of the first change-speed mechanism 3 and second change-speed mechanism 4 that is set on one of the first input shaft 21 and second input shaft 22 that one of the first clutch "C1" and second clutch "C2," which is put in the connected and disconnected states alternately, disconnects from the power source. First of all, the change-speed stage anticipator 52 estimates or presumes a temporary change-speed stage from a vehicular condition after a pre-shift time "Δt" for every element of an anticipated change-speed stage group. Note herein that the "anticipated change-speed stage group" can be made up of one or more of a plurality of change-speed stages that can be selected by the first gear-mechanism selector 32 or second gear-mechanism selector 42 that is associated with the first clutch "C1" or second clutch "C2." For example, it is possible to constitute the anticipated change-speed stage group of previous and subsequent change-speed stages to the current change-speed stage. Moreover, when no previous change-speed or subsequent stage is available, the anticipated change-speed stage group can be constituted of either the previous or subsequent change-speed stage. In addition, the anticipated change-speed stage group can be constituted of all of the change-speed stages that can be selected by the first gear-mechanism selector 32 or second gear-mechanism selector 42. The change-speed stage anticipator 52 applies a vehicle speed "tV" and accelerator opening magnitude "tTa" after a pre-shift time "Δt" to the shift map shown in FIG. 3 to find the temporary change-speed stage. The shift map that the change-speed stage anticipator 52 uses herein is the same as a shift map that the change-speed controller uses. However, it is allowable to employ shift maps, which differ each other, for the change-speed stage anticipator 52, and for the change-speed controller. FIG. 5 illustrates the shift map partially, from which parts that are relevant to the third-speed and fourth-speed shift lines are taken out. Let a vehicle be traveling at a current vehicle speed "V" and with an accelerator opening magnitude "Ta" and the change-speed stage be selected at the third speed in FIG. 5. On this occasion, the change-speed stage anticipator 52 is provided with a vehicle speed calculator 521 for calculating the vehicle speed "tV" after a pre-shift time "Δt," and an accelerator opening magnitude calculator 522 for calculating the accelerator opening magnitude "tTa" after the pre-shift time "Δt," for instance. Accordingly, the change-speed stage anticipator 52 computes the vehicle speed "tV" and accelerator opening magnitude "tTa" after a pre-shift time "Δt" by following expressions (1) and (2), based on a pre-shift time "Δt" that is required for shifting to the fourth speed, an anticipated change-speed stage.

"tV"=Current Vehicle Acceleration "ΔV"×Pre-shift
  Time "Δt"+Current Vehicle Speed "V"  (1)

"tTa"=Change Rate of Current Accelerator Opening
  Magnitude "ΔTa"×Pre-shift Time "Δt"+Current
  Accelerator Opening Magnitude "Ta"  (2)

Then, the change-speed stage anticipator 52 applies the computed vehicle speed "tV" and accelerator opening magnitude "tTa" after the pre-shift time "Δt" to the shift map shown in FIG. 5 to estimate or presume a temporary change-speed stage. Thus, the change-speed stage anticipator 52 derives the fourth speed from FIG. 5, and then determines it as a temporary change-speed stage. Note that the change-speed stage anticipator 52 uses a linear function to find the vehicle speed "tV" and accelerator opening magnitude "tTa" after a pre-shift time "Δt." However, it is possible for the change-speed stage anticipator 52 uses a quadratic-or-more nonlinear function to find them.

Thereafter, the change-speed stage anticipator 52 judges whether the resulting anticipated change-speed stage coincides with a temporary change-speed stage, which the change-speed stage anticipator 52 estimates or predicts for each instance after the pre-shift time "Δt" to which each element of the anticipated change-speed stage group corresponds. Then, the change-speed stage anticipator 52 adopts one of the estimated temporary change-speed stages (or estimated anticipated change-speed stages), which coincides with the computed anticipated change-speed stage, as a subsequent change-speed stage. In this round, the anticipated change-speed stage is the fourth speed; the temporary change-speed stage is the fourth speed; and they coincide with each other. Thus, the change-speed stage anticipator 52 adopts the fourth speed as a subsequent change-speed stage. After this, the controller 5 actuates the first gear-mechanism selector 32 and second gear-mechanism selector 42 so as to select a subsequent change-speed stage for the next round. Note that it is possible to make the change-speed stage anticipator 52 to select one of a plurality of the temporary change-speed stages, which is associated with the shortest pre-shift time "Δt," as a subsequent change-speed stage when some of them coincides with the anticipated change-speed stage.

Figure 6:
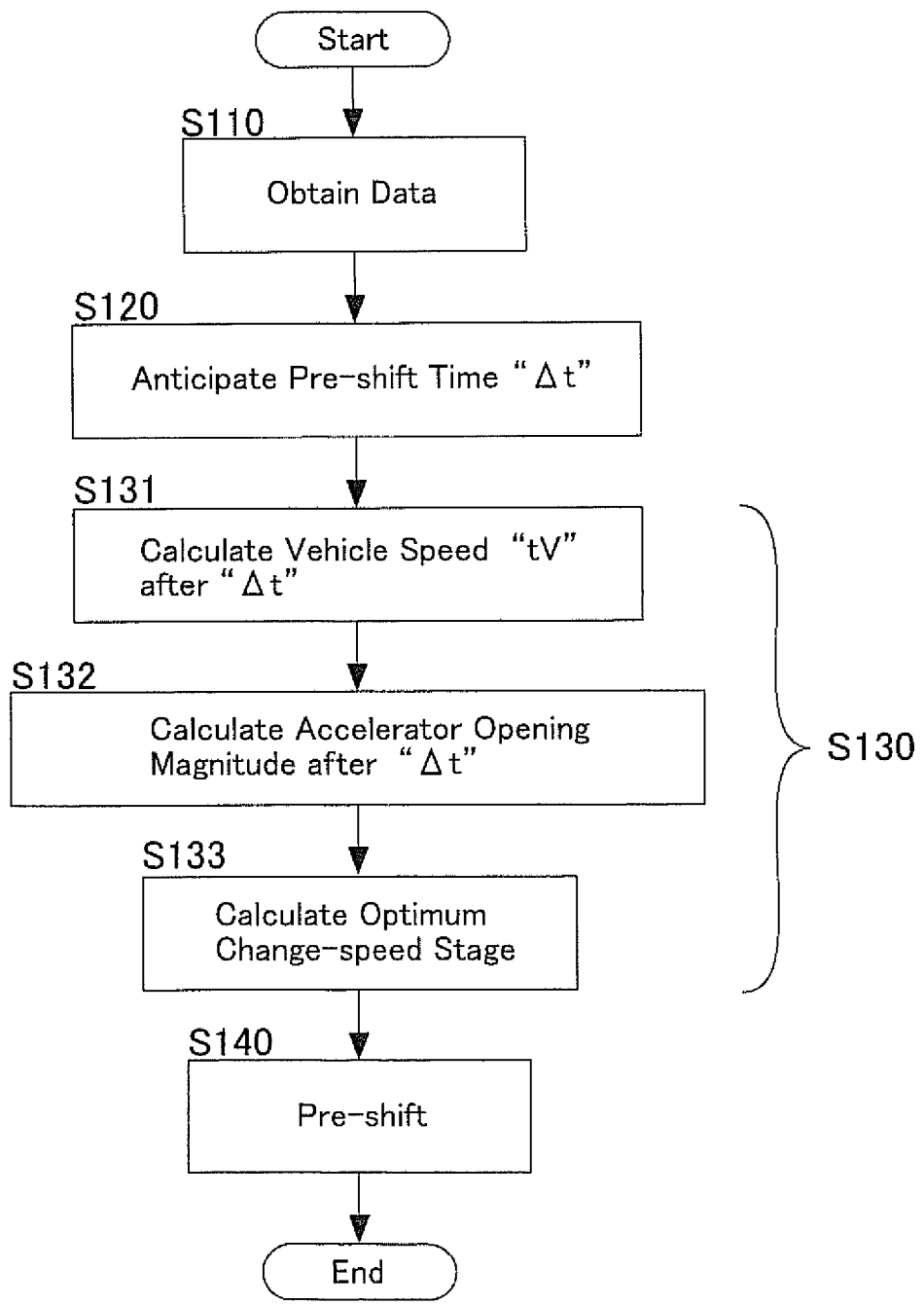
FIG. 6 is a flowchart illustrating a method of shift control for an exemplary transmission.

Next, a shift-control method for transmission will be described, shift-control method which the present transmission 1 according to Embodiment No. 1 employs. The controller 5 controls the transmission 1. FIG. 6 illustrates a flowchart for the shift-control method for the transmission 1 that the controller 5 executes representatively. Note that the present invention is not limited to FIG. 6 because the flowchart merely specifies one of the examples of the logic for the shift-control method.

The controller 5 controls the transmission 1 by means of the shift-control method that comprise a data obtaining step "S110," a pre-shift time anticipating step "S120," a change-speed stage anticipating step "S130," and a pre-shifting step "S140." The controller 5 obtains a state of vehicle, for instance, as data at the data obtaining step "S110." Moreover, at the pre-shift time anticipating step "S120," the controller 5 computes a pre-shift time "Δt" for each element of the anticipated change-speed stage group. Note that pre-shift time "Δt" is a time that is required for the first gear-mechanism selector 32 and second gear-mechanism selector 42 in one of the first change-speed mechanism 3 and second change-speed mechanism 4, which is set on one of the first input shaft 21 and second input shaft 22 that is disconnected from the power source by one of the first and second clutches "C1" and "C2," to pre-shift from a current change-speed stage to a subsequent change-speed stage. The pre-shift time anticipator 51 of the controller 5 determines the pre-shift time "Δt."

At the change-speed stage anticipating step "S130," the controller 5 anticipates or estimates a subsequent change-speed stage from the change-speed stage that is selected by one of the first change-speed mechanism 3 and second change-speed mechanism 4, which is set on one of the first input shaft 21 and second input shaft 22 that is disconnected from the power source. In order for the controller 5 to estimate a subsequent change-speed stage, the change-speed anticipating step "S130" is provided with a vehicle speed computing sub-step "S131," an accelerator opening magnitude computing sub-step "S132," and a temporary change-speed stage establishing sub-step "S133." At the vehicle speed computing step "S131," the controller 5 computes a vehicle speed "tV" after a pre-shift time "Δt" by above-described expression (1). Moreover, the controller 5 computes an accelerator opening magnitude "tTa" after the pre-shift time "Δt" by above-described expression (2) at the accelerator opening magnitude computing step "S132." In addition, at the temporary change-speed stage establishing sub-step "S133," the controller 5 estimates or presumes a subsequent change-speed stage from the shift map (e.g., FIG. 3) using the computed "tV" and "tTa." Moreover, the controller 5 judges whether the resulting subsequent change-speed stage coincides with each element of the anticipated change-speed stage group, and then adopts a coinciding temporary change-speed stage as a subsequent change-speed stage. Finally, at the pre-shifting step "S140," the controller 5 selects (or pre-shifts to the resultant subsequent change-speed stage that it has estimated or predicted at the change-speed stage anticipating step "S130."

Figure 7:
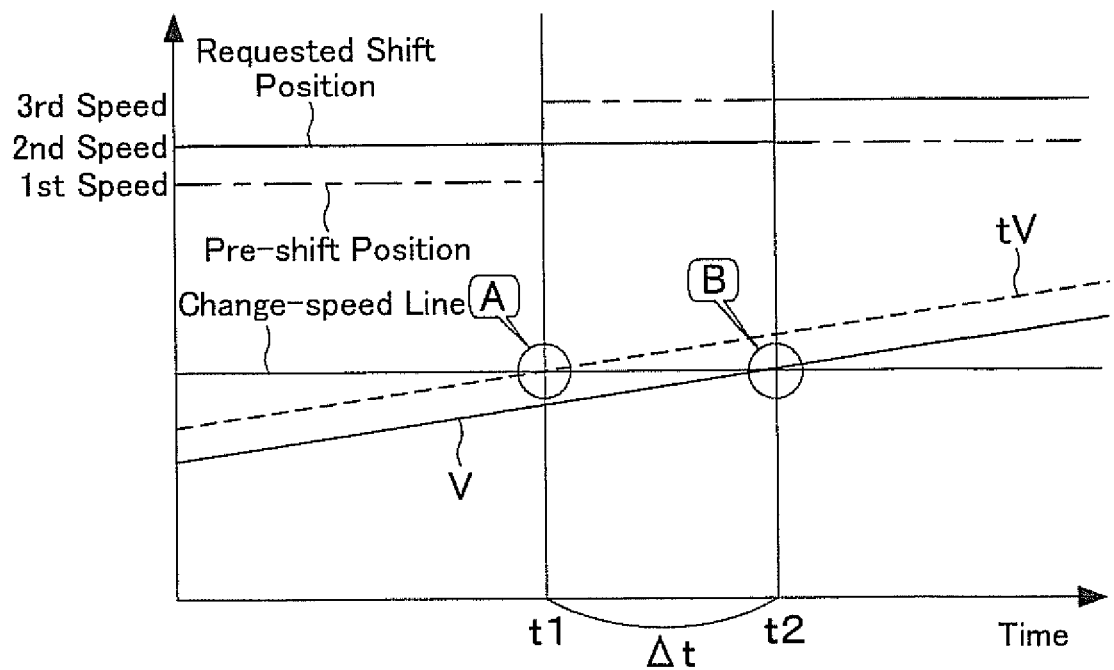
FIG. 7 is a graphical explanatory diagram illustrating how an exemplary the transmission is operated by a shift-control method.

FIG. 7 illustrates how the present transmission 1 and shift-control method for transmission according to Embodiment No. 1 operates a vehicle in changing the speed. The horizontal axis specifies a time, and the vertical axis specifies a shift position or a vehicle speed. Let a vehicle be accelerating with a constant accelerator opening magnitude "Ta" in this example. The solid line indicates a vehicle speed "V," whereas the broken line indicates a vehicle speed "tV" after a pre-shift time "Δt." Moreover, the lower horizontal line that intersects with the solid line "V" and broken line "tV" indicates a change-speed line for shifting from the second speed up to the third speed, for instance. In addition, the time "t1" indicates a current time. At the time point "t1," the controller 5 estimates a pre-shift time "Δt," and then computes a vehicle speed "tV" after the pre-shift time "Δt." Note that an accelerator opening magnitude "tTa" after the pre-shift time "Δt" is not considered in this example because it is constant. At the time "t1," the broken line "tV" intersects with the change-speed line at the coordinate "A." Accordingly, a pre-shift position that the alternate long and short dash line specifies changes from the first speed to the third speed. Moreover, a change-speed request position that the upper horizontal line specifies changes from the second speed to the third speed at the time "t2." Consequently, when a driver issues a change-speed request at the time "t2" after the pre-shift time "Δt," the transmission 1 according to Embodiment No. 1 carries out the change-speed quickly because it has already pre-shifted to the third speed before the time passes from "t1" to "t2."

The present transmission 1 and shift-control method for transmission according to Embodiment No. 1 comprises the controller 5 that is provided with the change-speed stage anticipator 52. For example, the change-speed stage anticipator 52 estimates a temporary change-speed stage after a pre-shift time "Δt" for each element of the anticipated change-speed stage group, and then adopts one of the estimated temporary change-speed stages as a subsequent change-speed stage when it coincides with an anticipated change-speed stage. That is, the controller 5 employs the anticipated change-speed as it is when the anticipated change-speed stage is consistent with one of the estimated temporary change-speed stages. The first gear-mechanism selector 32 and second gear-mechanism selector 42 requires a time for pre-shifting from the current change-speed stage to other change-speed stages (or anticipated change-speed stages), respectively. Accordingly, depending on vehicular conditions after the pre-shift time "Δt," the first gear-mechanism selector 32 and second gear-mechanism selector 42 might pre-shift to an inappropriate change-speed stage. Consequently, the controller 5 controls the first gear-mechanism selector 32 and second gear-mechanism selector 42 so as to pre-shift to an appropriate subsequent change-speed stage at which the change-speed stage anticipator 52 finds out that the anticipated change-speed stage matches one of the estimated temporary change-speed stages. Thus, the transmission 1 according to Embodiment No. 1 carries out the change-speed operation smoothly because the first change-speed mechanism 3 and second change-speed mechanism 4 are pre-shifted to a change-speed stage that is suitable for one upon the issuance of the driver's change-speed request after the pre-shift time "Δt." As a result, the driver does not feel any annoyance or unpleasantness at all. In particular, when the vehicle decelerates rapidly or accelerates rapidly, the transmission 1 and shift-control method for transmission according to Embodiment No. 1 makes it possible to select an adequate change-speed stage, compared with the conventional transmission and shift-control method which anticipates or predicts the change-speed stage based on the current vehicular condition.

Embodiment No. 2

Figure 8:
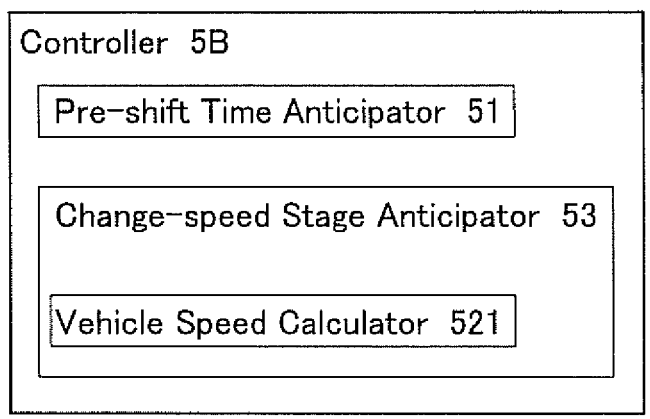
FIG. 8 is an explanatory block diagram illustrating an exemplary controller for a transmission.

As illustrated in FIG. 8, the present transmission 1 and shift-control method for transmission according to Embodiment No. 2 uses a controller 5B that comprises a pre-shift time anticipator 51, a change-speed stage anticipator 53 and a not-shown change-speed controller. FIG. 8 is an explanatory diagram for showing the controller 5B alone that is taken out of the transmission 1 according to Embodiment No. 2. In essence, the transmission 1 and shift-control method for transmission according to Embodiment No. 2 produces the same advantageous effects as those of the transmission 1 and shift-control method for transmission according to Embodiment No. 1.

For the pre-shift time anticipator 51 of the controller 5B, it is possible to employ the same pre-shift time anticipator 51 as the one used in the controller 5 that is directed to the transmission 1 according to Embodiment No. 1.

Figure 9:
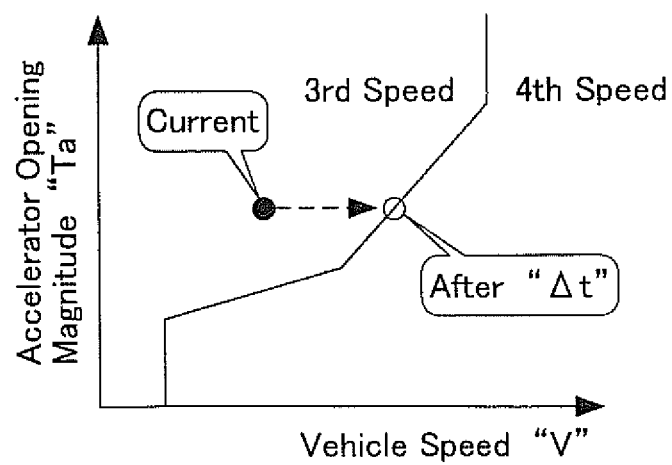
FIG. 9 is a graphical explanatory diagram illustrating how an exemplary controller for a transmission estimates an optimum change-speed stage.

The change-speed stage anticipator 53 anticipates a subsequent change-speed stage from the change-speed stage of the first change-speed mechanism 3 or second change-speed mechanism 4 that is set on the first input shaft 21 or second input shaft 22 that is disconnected from the power source by the first clutch "C1" or second clutch "C2" that is put in the connected and disconnected states alternately. First of all, the change-speed stage anticipator 53 estimates or presumes a temporary change-speed stage from a vehicular condition after a pre-shift time "Δt" for every element of an anticipated change-speed stage group. Note herein that the "anticipated change-speed stage group" can be made up of one or more of a plurality of change-speed stages that can be selected by the first gear-mechanism selector 32 or second gear-mechanism 42 that is associated with the first clutch "C1" or second clutch "C2." Specifically, the change-speed stage anticipator 53 finds the temporary change-speed stage by applying a vehicle speed "tV" after a pre-shift time "Δt" and a current accelerator opening magnitude "Ta" to the shift map shown in FIG. 3, for instance. FIG. 9 illustrates a part of the shift map which focuses on portions that are relevant to the third-speed and fourth-speed shift lines. Let a vehicle be traveling at a current vehicle speed "V" and with a current accelerator opening magnitude "Ta" and the change-speed stage be selected at the third speed in FIG. 9. On this occasion, the change-speed stage anticipator 53 is provided with a vehicle speed calculator 521 for calculating the vehicle speed "tV" after a pre-shift time "Δt." Note that the vehicle speed calculator 521 calculates the vehicle speed "tV" after a pre-shift time "Δt" on the assumption that an anticipated change-speed stage would be the fourth speed. Moreover, the vehicle speed calculator 521 can be the same as the vehicle speed calculator 521 used in the controller 5 that is directed to the transmission 1 according to Embodiment No. 1. Then, the change-speed stage anticipator 53 estimates or predicts a temporary change-speed stage by applying the computed vehicle speed "tV" and the current accelerator opening magnitude "Ta" to the shift map. According to FIG. 9, the change-speed stage anticipator 53 derives the fourth speed, that is, estimates or presumes the fourth speed as a temporary change-speed stage.

Thereafter, the change-speed stage anticipator 53 judges whether the resulting anticipated change-speed stage coincides with a temporary change-speed stage, which is estimated for each instance after the pre-shift time "Δt" to which each element of the anticipated change-speed stage group corresponds. Then, the change-speed stage anticipator 53 adopts one of the temporary change-speed stages (or anticipated change-speed stages), which coincides with the computed anticipated change-speed stage, as a subsequent change-speed stage. In this round, the anticipated change-speed stage is the fourth speed; the temporary change-speed stage is the fourth speed; and they coincide with each other. Thus, the change-speed stage anticipator 53 adopts the fourth speed as a subsequent change-speed stage. After this, the controller 5B actuates the first gear-mechanism selector 32 and second gear-mechanism selector 42 so as to select a subsequent change-speed stage for the next round.

Figure 10:
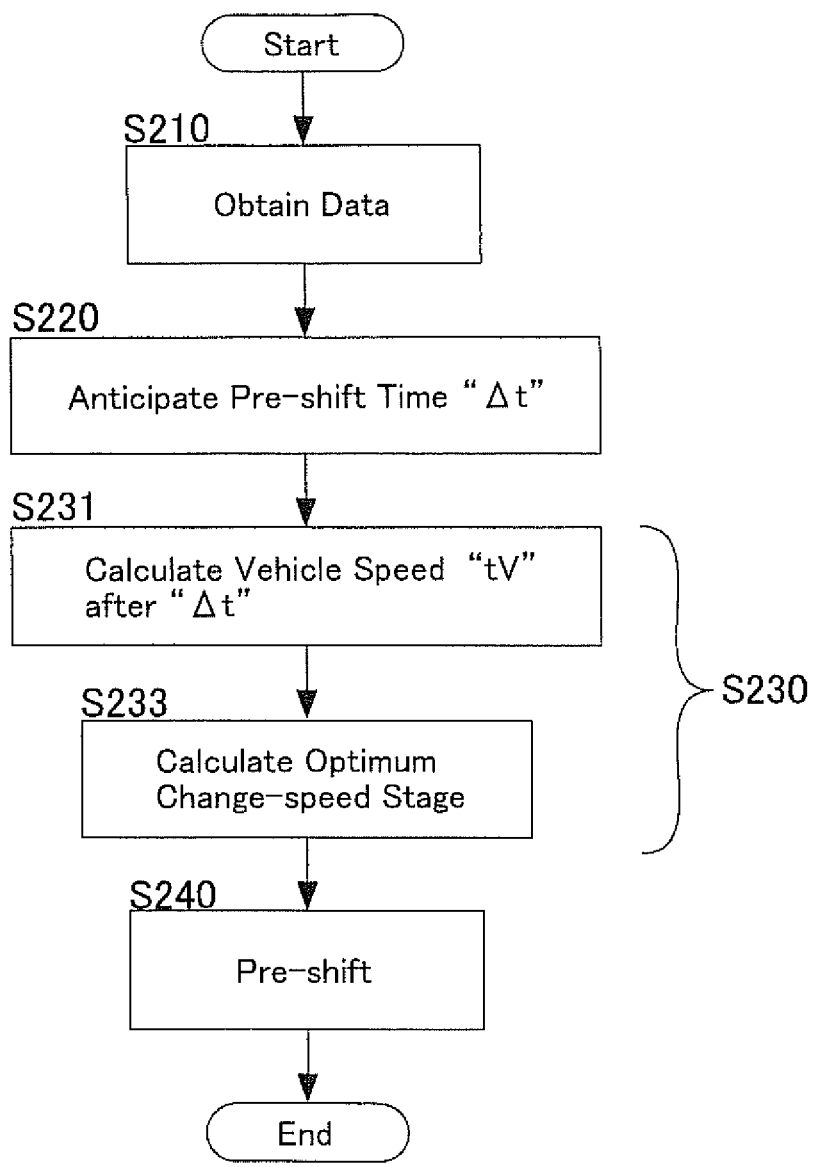
FIG. 10 is a flowchart illustrating a method of shift control for an exemplary transmission.

Next, a shift-control method for transmission will be described, shift-control method which the present transmission 1 according to Embodiment No. 1 employs. The controller 5B controls the transmission 1. FIG. 10 illustrates a flowchart for the shift-control method for the transmission 1 that the controller 5B executes representatively. Note that the present invention is not limited to FIG. 10 because the flowchart merely specifies one of the examples of the logic for the shift-control method.

The controller 5B controls the transmission 1 by means of the shift-control method that comprise a data obtaining step "S210," a pre-shift time anticipating step "S220," a change-speed stage anticipating step "S230," and a pre-shifting step "S240." The controller 5B detects a state of vehicle, for instance, at the data obtaining step "S210." Moreover, at the pre-shift time anticipating step "S220," the controller 5B computes a pre-shift time "Δt" for each element of the anticipated change-speed stage group.

At the change-speed stage anticipating step "S230," the controller 5B anticipates or estimates a subsequent change-speed stage. In order for the controller 5B to estimate a subsequent change-speed stage, the change-speed stage anticipating step "S230" is provided with a vehicle speed computing sub-step "S231," and a temporary change-speed stage establishing sub-step "S233." At the vehicle speed computing sub-step "S231," the controller 5B computes a vehicle speed "tV" by above-described expression (1). Moreover, at the temporary change-speed stage establishing sub-step "S233," the controller 5B estimates or presumes a subsequent change-speed stage from the shift map (e.g., FIG. 3) using the computed "tV" and "tTa." Moreover, the controller 5B judges whether the resulting subsequent change-speed stage coincides with each element of the anticipated change-speed stage group, and then adopts a coinciding temporary change-speed stage as a subsequent change-speed stage. Finally, at the pre-shifting step "S240," the controller 5B selects (or pre-shifts to) the resultant subsequent change-speed stage that it has estimated or predicted at the change-speed stage anticipating step "S230."

Embodiment No. 3

Figure 11:
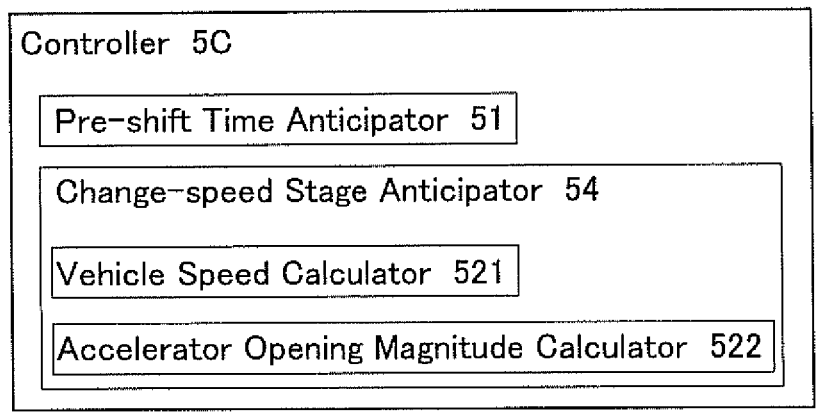
FIG. 11 is an explanatory block diagram illustrating an exemplary controller for a transmission.

As illustrated in FIG. 11, the present transmission 1 and shift-control method for transmission according to Embodiment No. 3 uses a controller 5C that comprises a pre-shift time anticipator 51, a change-speed stage anticipator 54 and a not-shown change-speed controller. FIG. 11 is an explanatory diagram for showing the controller 5C alone that is taken out of the transmission 1 according to Embodiment No. 3. In essence, the transmission 1 and shift-control method for transmission according to Embodiment No. 3 produces the same advantageous effects as those of the transmission 1 and shift-control method for transmission according to Embodiment No. 1.

Figure 12:
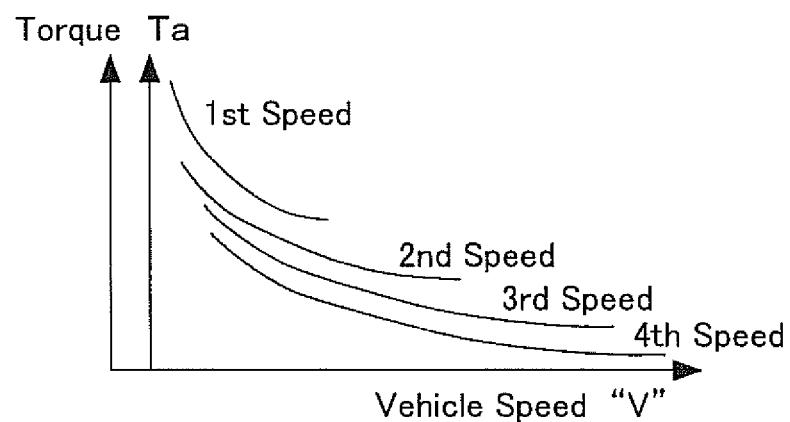
FIG. 12 is a graphical explanatory diagram illustrating how an exemplary controller for a transmission estimates an optimum change-speed stage.
Figure 13:
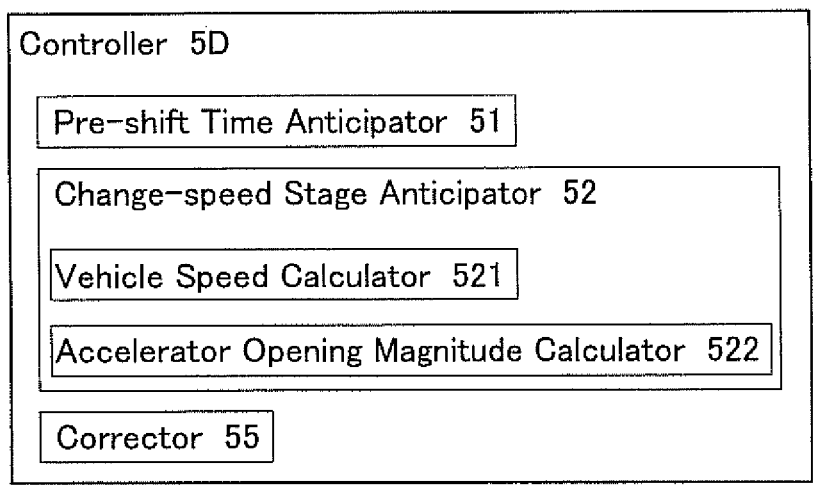
FIG. 13 is an explanatory block diagram illustrating an exemplary controller for a transmission.

The change-speed stage anticipator 54 anticipates a subsequent change-speed stage from the change-speed stage of one of the first change-speed mechanism 3 and second change-speed mechanism 4. Note that the phrase, "one of the first change-speed mechanism 3 and second change-speed mechanism 4," means one of them that is set on the first input shaft 21 or second input shaft 22 that is disconnected from the power source by the first clutch "C1" or second clutch "C2" that is put in the connected and disconnected states alternately. First of all, the change-speed stage anticipator 54 estimates or presumes a temporary change-speed stage from a vehicular condition after a pre-shift time "Δt" for every element of an anticipated change-speed stage group. Note herein that the "anticipated change-speed stage group" can be made up of one or more of a plurality of change-speed stages that can be selected by the first gear-mechanism selector 32 or second gear-mechanism 42 that is associated with the first clutch "C1" or second clutch "C2." Specifically, the change-speed stage anticipator 54 derives a change-speed stage that conforms to a torque for the every element of the anticipated change-speed stage group using a vehicle speed "tV" and accelerator opening magnitude "tTa" after a pre-shift time "Δt" while consulting a shift map as shown in FIG. 12, for instance. FIG. 12 is a shift map that specifies change-speed stages that conform to vehicle speeds "V," accelerator opening magnitudes "Ta" and torques for change-speed stages, respectively. Moreover, as illustrated in FIG. 13, the change-speed stage anticipator 54 is provided with a vehicle speed calculator 521, and an accelerator opening magnitude calculator 522. The vehicle speed calculator 521 calculates vehicle speeds "tV" after pre-shift times "Δt," respectively. The accelerator opening magnitude calculator 522 calculates accelerator opening magnitudes "tTa" after pre-shift times "Δt," respectively. Note that the vehicle speed calculator 521 and accelerator opening magnitude calculator 522 can be the same as those used in the controller 5 that is directed to the transmission 1 according to Embodiment No. 1.

Thereafter, the change-speed stage anticipator 54 judges whether the resulting anticipated change-speed stage coincides with a temporary change-speed stage, which is estimated for each instance after the pre-shift time "Δt" to which each element of the anticipated change-speed stage group corresponds. Then, the change-speed stage anticipator 54 adopts one of the temporary change-speed stages (or anticipated change-speed stages), which coincides with the computed anticipated change-speed stage, as a subsequent change-speed stage. After this, the controller 5C actuates the first gear-mechanism selector 32 and second gear-mechanism selector 42 so as to select a subsequent change-speed stage for the next round.

In essence, a shift-control method for transmission that is employed in the present transmission 1 according to Embodiment No. 3 is the same as the above-described shift-control method for transmission that is employed in the present transmission 1 according to Embodiment No. 1. However, the shift-control control methods differ each other in the temporary change-speed stage establishing sub-step "S133" of the change-speed stage anticipating step "S130." Specifically, at the temporary change-speed stage establishing sub-step "S133" of the change-speed stage anticipating step "S130," the controller 5C that is directed to the transmission 1 according to Embodiment No. 3 uses a vehicle speed "tV" and accelerator opening magnitude "tTa" after a pre-shift time "Δt" to estimate or presume a change-speed stage that conforms to a torque for the every element of the anticipated change-speed stage group with reference to the shift map shown in FIG. 12.

Embodiment No. 4

The present transmission 1 and shift-control method for transmission according to Embodiment No. 4 use a controller 5D. As illustrated in FIG. 13, the controller 5D comprises a pre-shift time anticipator 51, a change-speed stage anticipator 52, a corrector 55, and a not-shown change-speed controller. FIG. 13 is an explanatory diagram for showing the controller 5D alone that is taken out of the transmission 1 according to Embodiment No. 4. Note that, in order to make the controller 5D, the corrector 55 is added to the controller 5 that is directed to the transmission 1 according to Embodiment No. 1. The transmission 1 and shift-control method for transmission according to Embodiment No. 4 produce essentially the same advantageous effects as those that the transmission 1 and shift-control method for transmission according to Embodiment No. 1 produce.

Figure 14:
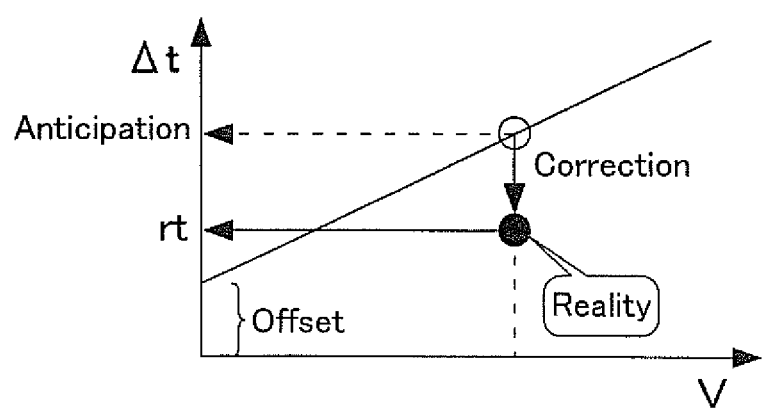
FIG. 14 is a graphical explanatory diagram illustrating how an exemplary the controller for a transmission corrects a pre-shift time.
Figure 15:
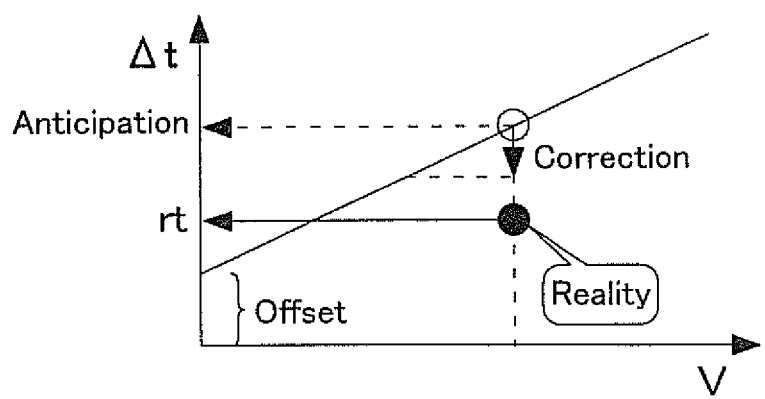
FIG. 15 is a graphical explanatory diagram illustrating how an exemplary controller for a transmission corrects a pre-shift time.

As illustrated in FIGS. 14 and 15, the corrector 55 corrects the estimated pre-shift time, which the pre-shift time anticipator 51 has estimated or anticipated, based on a real pre-shift time "rt" that the first gear-mechanism selector 32 and second gear-mechanism 42 require. For example, as shown in FIG. 14, the corrector 55 corrects the estimated pre-shift time down to the real pre-shift time "rt." On the other hand, the corrector 55 computes a difference between the real pre-shift time "rt" and the estimated pre-shift time "Δt," multiplies the resulting difference by a predetermined correction factor, and then subtract the resultant product from the estimated pre-shift time "Δt" to obtain a corrected value.

Figure 16:
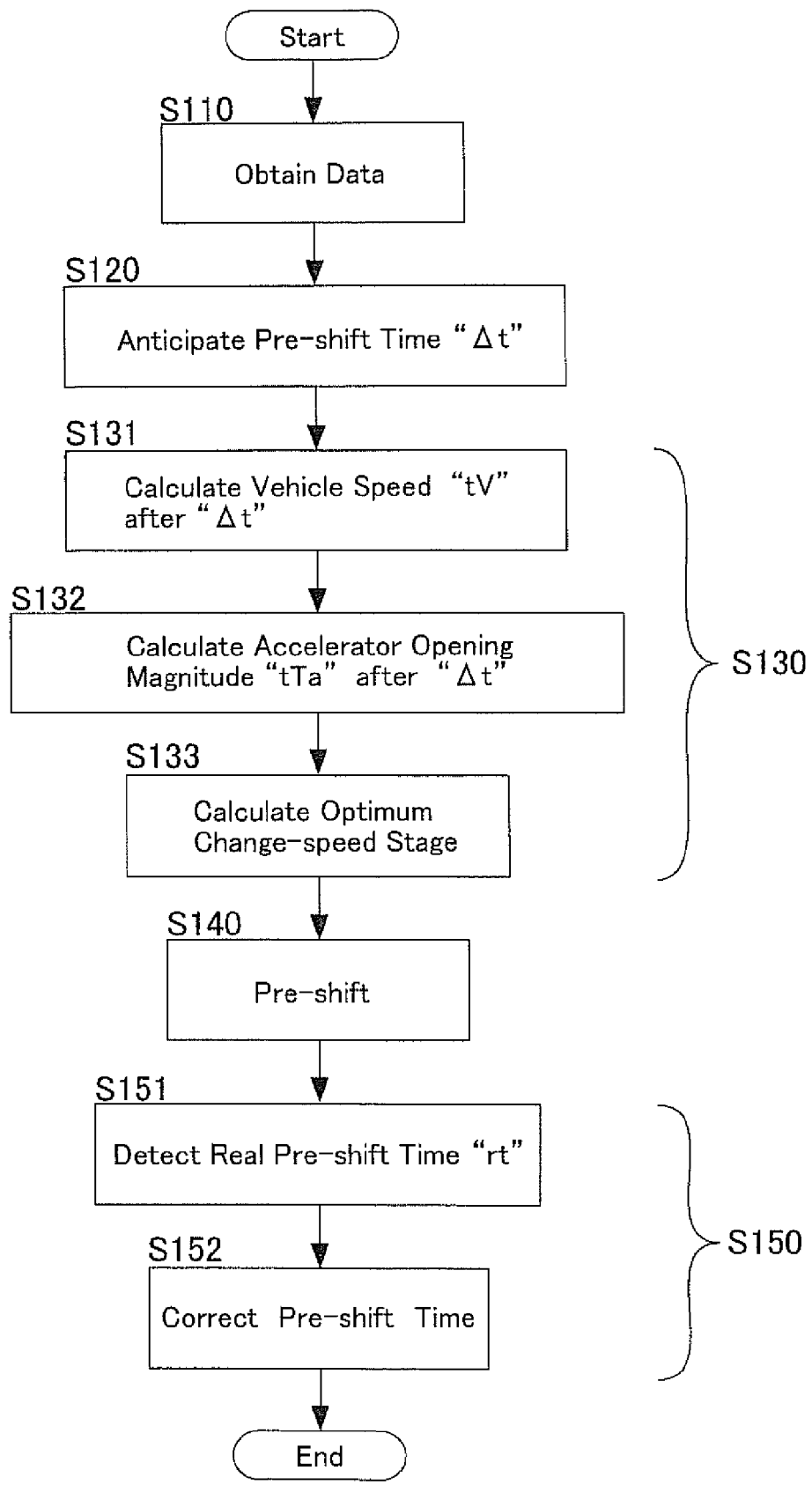
FIG. 16 is a flowchart illustrating an exemplary shift control method for a transmission.

A shift-control method for transmission will be hereinafter described, shift-control method which the present transmission 1 according to Embodiment No. 4 employs. The controller 5D controls the transmission 1. FIG. 16 illustrates a flow-chart for the shift-control method for the transmission 1 that the controller 5D executes representatively. Note that the present invention is not limited to FIG. 16 because the flowchart merely specifies one of the examples of the logic for the shift-control method.

As shown in FIG. 16, the controller 5D further executes a correcting step "S150" in addition to the steps that the controller 5 that controls the transmission 1 according to Embodiment No. 1 executes. The correcting step "S150" is provided with a real pre-shift time detecting sub-step "S151," and a learning sub-step "S152." The controller 5D detects a real pre-shift time "rt" at the real pre-shift time detecting sub-step "S151" after the pre-shifting step "S140." Then, at the learning sub-step "S152," the controller 5D corrects the estimated pre-shift time Δt, which has been estimated or anticipated at the pre-shift time anticipating step "S120," based on the detected real pre-shift time "rt."

The present transmission 1 and shift-control method for transmission according to Embodiment No. 4 makes it possible to estimate or presume a pre-shift time Δt more accurately because the pre-shift time Δt is corrected for every vehicle as described above. Therefore, it is possible for the controller 5D to estimate or predict an anticipated subsequent change-speed stage after the pre-shift time Δt more adequately.

Embodiment No. 5

The present transmission 1 according to Embodiment No. 5 comprises the controller 5B of the transmission 1 according to Embodiment No. 2, and a corrector that is added to the controller 5B. The added corrector operates in the same manner as the corrector 5D that is directed to the transmission 1 according to Embodiment No 4 operates. The present shift-control method for transmission according to Embodiment No. 5 comprises the steps of the shift-control method for transmission according to Embodiment No. 2, and a correcting step in addition to the steps. In the added correcting step, the controller 5B is operated in the same manner as the correcting step "S150" that is relevant to the shift-control method for transmission according to Embodiment No. 4. Thus, in essence, the transmission 1 and shift-control method for transmission according to Embodiment No. 5 produce advantageous effects in the same manner as the transmission 1 and shift-control method for transmission according to Embodiment No. 2 produce. Moreover, the present transmission 1 and shift-control method for transmission according to Embodiment No. 5 enable the controller 5B to estimate or presume a pre-shift time Δt more accurately because the corrector corrects the pre-shift time Δt for every vehicle. Therefore, the controller 5B can estimate or predict an anticipated subsequent change-speed stage after the pre-shift time Δt more adequately.

Embodiment No. 6

The present transmission 1 according to Embodiment No. 6 comprises the controller 5C of the transmission 1 according to Embodiment No. 3, and a corrector that is added to the controller 5C. The added corrector operates in the same manner as the corrector 5C that is directed to the transmission 1 according to Embodiment No 4 operates. The present shift-control method for transmission according to Embodiment No. 6 comprises the steps of the shift-control method for transmission according to Embodiment No. 3, and a correcting step in addition to the steps. In the added correcting step, the controller 5C is operated in the same manner as the correcting step "S150" that is relevant to the shift-control method for transmission according to Embodiment No. 4. Thus, in essence, the transmission 1 and shift-control method for transmission according to Embodiment No. 6 produce advantageous effects in the same manner as the transmission 1 and shift-control method for transmission according to Embodiment No. 3 produce. Moreover, the present transmission 1 and shift-control method for transmission according to Embodiment No. 5 enable the controller 5C to estimate or presume a pre-shift time Δt more accurately because the corrector corrects the pre-shift time Δt for every vehicle. Therefore, the controller 5C can estimate or predict an anticipated subsequent change-speed stage after the pre-shift time Δt more adequately.

Other Embodiments

Although the present invention has been described in detail with reference to some of the preferred embodiments, it is not at all limited to above-described Embodiment Nos. 1 through 6. Whereas Embodiment Nos. 1 through 3 comprise the pre-shift time anticipator and pre-shift time anticipating step for estimating or presuming a pre-shift time Δt, for instance, it is possible to make the pre-shift time Δt a constant value that is independent of vehicular conditions and then estimate or predict a change-speed stage after the pre-shift time Δt without ever estimating or presuming the pre-shift time Δt. For example, it is possible to think of the following variations of the pre-shift time Δt: setting a single pre-shift time Δt; setting a pre-shift time Δt for each of change-speed stages; and making a pre-shift time Δt different for shifting up and shifting down. Moreover, it is possible to combine a plurality of vehicular conditions in order to estimate or predict a pre-shift time Δt.

In addition, the transmission 1 except for the controllers 5, 5B, 5C and 5D can be transmissions having dual-clutch mechanisms other than the dual-clutch mechanism that is described in the present specification.

Having now fully described the present invention, it will be apparent to one of ordinary skill in the art that many changes and modifications can be made thereto without departing from the spirit or scope of the present invention as set forth herein including the appended claims.

What is claimed is:

1. A transmission for use in a vehicle, the transmission comprising:
    a first clutch to switch between a first connection state, in which the first clutch is connected to a power source, and a first disconnection state, in which the first clutch is disconnected from the power source;
    a second clutch to switch between a second connection state, in which the second clutch is connected to the power source, and a second disconnection state, in which the second clutch is disconnected from the power source;
    a first input shaft detachably connected to the power source by the first clutch;
    a second input shaft detachably connected to the power source by the second clutch;
    an output shaft;
    a first change-speed mechanism disposed between the first input shaft and the output shaft, the first change-speed mechanism comprising:
        a first gear mechanism including a plurality of change-speed stages having a plurality of gears; and
        a first gear-mechanism selector to select one of the plurality of change-speed stages;

a second change-speed mechanism disposed between the second input shaft and the output shaft, the second change-speed mechanism comprising:
   a second gear mechanism including a plurality of change-speed stages having a plurality of gears; and
   a second gear-mechanism selector to select one of the plurality of change-speed stages; and
a controller to control the first clutch, the second clutch, the first gear-mechanism selector, and the second gear-mechanism selector based on an estimated pre-shift time ($\Delta t$), which is an estimated time required for the first gear-mechanism selector or the second gear-mechanism selector to shift a current change-speed stage to a subsequent change-speed stage, the controller comprising:
   a change-speed stage anticipator to operate the first gear-mechanism selector or the second gear-mechanism selector based on identifying a temporary change-speed stage, which is estimated based on a state of the vehicle after the estimated pre-shift time, as a subsequent change-speed stage when the temporary change-speed stage coincides with an anticipated change-speed stage, stored in an anticipated change-speed group, that corresponds to the estimated pre-shift time ($\Delta t$).

2. The transmission according to claim 1, where the anticipated change-speed stage group comprises one or more previous change-speed stages or one or more subsequent change-speed stages, with respect to a current change-speed stage, that the first gear-mechanism selector or the second gear-mechanism selector has currently selected.

3. The transmission according to claim 1, where the anticipated change-speed stage group includes all of a number of change-speed stages that the first gear-mechanism selector or the second gear-mechanism selector can select.

4. The transmission according to claim 1, where the change-speed stage anticipator is to estimate the temporary change-speed stage based on a shift map using a vehicle speed (tV) after the estimated pre-shift time ($\Delta t$) and a current accelerator opening magnitude (Ta).

5. The transmission according to claim 1, where the change-speed stage anticipator is to estimate the temporary change-speed stage based on a shift map using a vehicle speed (tV) after the estimated pre-shift time ($\Delta t$) and an accelerator opening magnitude (tTa) after the pre-shift time ($\Delta t$).

6. The transmission according to claim 1, where the current change-speed stage determines the temporary change-speed stage to be the subsequent change-speed stage based on the temporary change-speed stage matching a torque, for every change-speed stage listed in the anticipated change-speed group, that is estimated from the vehicle speed (tV) after the estimated pre-shift time ($\Delta t$) and an accelerator opening magnitude (tTa) after the estimated pre-shift time ($\Delta t$).

7. The transmission according to claim 1, where the controller further comprises:
   a pre-shift time anticipator to calculate the estimated pre-shift time ($\Delta t$) based on the state of the vehicle.

8. The transmission according to claim 1, where the controller further comprises:
   a corrector to correct the estimated pre-shift time based on an actual pre-shift time of the first gear-mechanism selector or the second gear-mechanism selector requires for the shifting.

9. A method of shift control for a transmission, the transmission comprising:
   switching a first clutch between a first connection state, in which the first clutch is connected to a power source, and a first disconnection state, in which the first clutch is disconnected from the power source;
   switching a second clutch between a first connection state, in which the second clutch is connected to the power source, and a second disconnection state, in which the second clutch is disconnected from the power source;
   detachably connecting a first input shaft to the power source by the first clutch;
   detachably connecting a second input shaft detachably connected to the power source by the second clutch;
   disposing a first change-speed mechanism, including a first gear mechanism having a plurality of change-speed stages having a plurality of gears, and a first gear-mechanism selector to select one of the plurality of change-speed stages, between the first input shaft and an output shaft;
   disposing a second change-speed mechanism, including a plurality of change-speed stages having a plurality of gears, and a second gear-mechanism selector to select one of the change-speed stages, between the second input shaft and the output shaft;
   control, via a controller, the first clutch, the second clutch, the first gear-mechanism selector, and the second gear-mechanism selector based on an estimated pre-shift time ($\Delta t$), which is an estimated time required for the first gear-mechanism selector or the second gear-mechanism selector to shift a current change-speed stage to a subsequent change-speed stage, wherein the controller includes a change speed anticipator to:
      operate the first gear-mechanism selector or the second gear-mechanism selector based on identifying a temporary change-speed stage, which is estimated based on a state of the vehicle after the estimated pre-shift time, as a subsequent change-speed stage when the temporary change-speed stage coincides with an anticipated change-speed stage, stored in an anticipated change-speed group, that corresponds to the estimated pre-shift time ($\Delta t$).

10. The method according to claim 9, wherein the anticipated change-speed stage group comprises one or more previous change-speed stages or one or more subsequent change-speed stages, with respect to a current change-speed stage, that the first gear-mechanism selector or the second gear-mechanism selector has currently selected.

11. The method according to claim 9, wherein the anticipated change-speed stage group includes all of a number of change-speed stages that the first gear-mechanism selector or the second gear-mechanism selector can select.

12. The method according to claim 9, wherein the identifying the temporary change-speed stage further comprises:
   identifying the temporary change-speed stage based on a shift map using a vehicle speed (tV) after the pre-shift time ($\Delta t$), and a current accelerator opening magnitude (Ta).

13. The method according to claim 9, wherein the identifying temporary change-speed stage further comprises:
   identifying the temporary change-speed stage based on a shift map using a vehicle speed (tV) after the pre-shift time, and an accelerator opening magnitude (tTa) after the pre-shift time ($\Delta t$).

14. The method according to claim 9, wherein the current change-speed stage is to:
   determine the temporary change-speed stage to be the subsequent change-speed stage based on the temporary change-speed stage matching a torque, for every change-speed stage listed in the anticipated change-speed group, that is estimated from the vehicle speed (tV) after the estimated pre-shift time (Δt) and an accelerator opening magnitude (tTa) after the estimated pre-shift time (Δt).

15. The method according to claim 9 further comprising:
calculating, via the controller, the pre-shift time based on a state of the vehicle.

16. The method according to claim 9 further comprising:
correcting, via the controller, the pre-shift time based on an actual pre-shift time of the first gear-mechanism selector or the second gear-mechanism selector requires for the shifting.

* * * * *